United States Patent [19]

Poveromo

[11] 4,360,436

[45] Nov. 23, 1982

[54] MOBILE FUEL EXTENDING SYSTEM AND METHOD

[76] Inventor: Vito L. Poveromo, 152 Oakside Rd., Smithtown, N.Y. 11787

[21] Appl. No.: 296,543

[22] Filed: Aug. 26, 1981

[51] Int. Cl.[3] .................... B01D 17/02; B01D 35/02

[52] U.S. Cl. .................................. 210/799; 210/805; 210/87; 210/167; 210/172; 210/241

[58] Field of Search ................ 210/779, 799, 805, 87, 210/88, 167, 172, 196, 241

[56] References Cited

U.S. PATENT DOCUMENTS

| | | | |
|---|---|---|---|
| 1,962,463 | 6/1934 | Renehew | 210/241 X |
| 2,047,449 | 7/1936 | Wilbur | 210/241 X |
| 2,425,848 | 8/1947 | Vawter | 210/241 X |
| 4,153,553 | 5/1979 | Davis | 210/167 X |
| 4,308,139 | 12/1981 | Piepho | 210/241 |

FOREIGN PATENT DOCUMENTS

| | | | |
|---|---|---|---|
| 742136 | 12/1955 | United Kingdom | 210/241 |

*Primary Examiner*—John Adee
*Attorney, Agent, or Firm*—Leonard Belkin

[57] ABSTRACT

Mobile apparatus and a method for reprocessing waste crank case oil product and mixing this product with fuel oil in preselected proportions to render said product useful as a fuel. The apparatus is designed to be mounted on a vehicle so that processing is done in situ with the waste oil product being withdrawn, reprocessed, mixed, and discharged into the fuel oil tank taking place at the same time.

9 Claims, 1 Drawing Figure

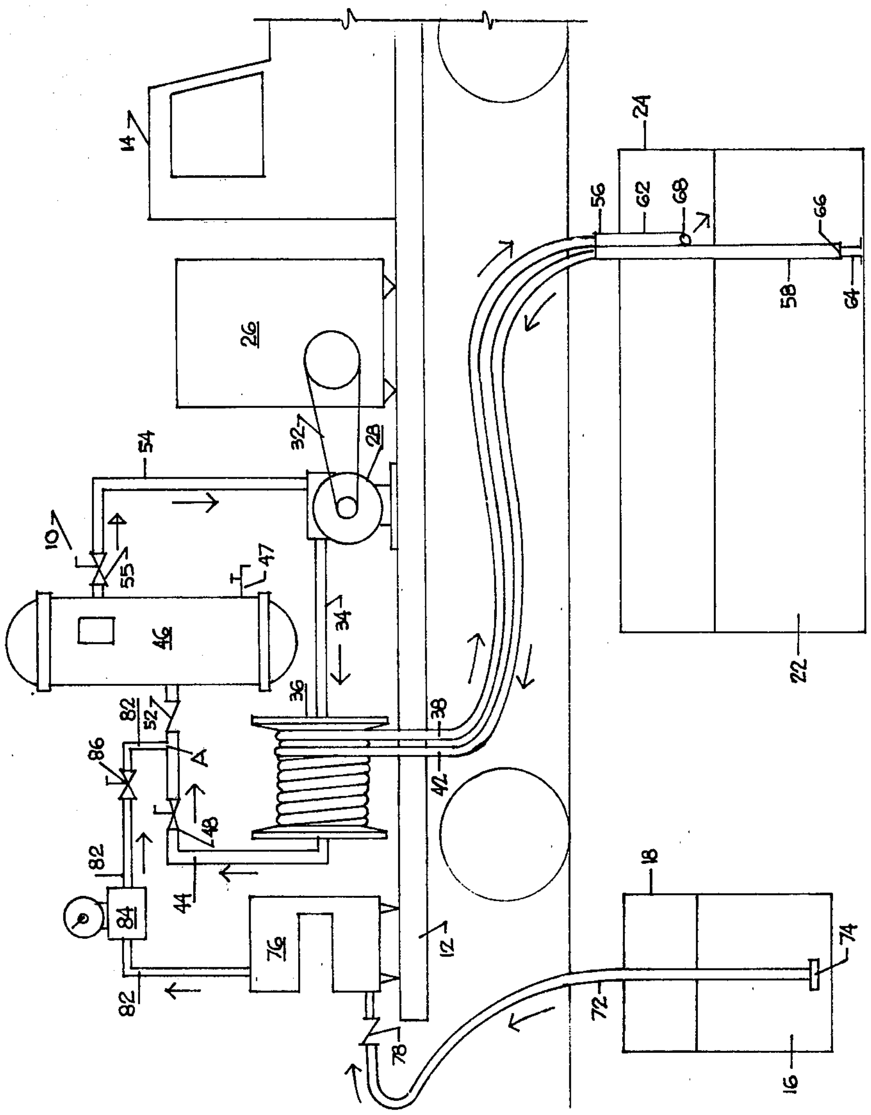
14
26
24
56
62
68
66
58
64
32
28
54
10
55
47
46
34
36
22
38
42
82
52
A
86
48
82
44
18
84
76
12
74
72
82
78
16

MOBILE FUEL EXTENDING SYSTEM AND METHOD

BACKGROUND OF THE INVENTION

The present invention relates to a mobile system and method for extending the fuel oil in automotive service stations and other establishments by enhancement with waste oils.

In a typical service station, waste oils drained from the crank cases of automotive vehicles are collected in tanks. Periodically, these tanks are emptied by collection companies. As the service station has no use for this waste oil product and local laws typically bar the disposal of this product through normal sewage channels (i.e., drains), the removal of this product by a collection company is in effect a service performed for the benefit of the service station owner. One result of this situation is that the service station owner receives very little in the way of compensation for the removal of the waste crank case oil.

Once the waste oil is removed it may be taken to a plant where it is reprocessed to be used as a lubricating oil. Such systems are shown in U.S. Pat. Nos. 1,318,086, 3,620,967 and 3,625,881. Similar efforts have been devised to provide in situ reprocessing using portable equipment and a typical arrangement is shown in U.S. Pat. No. 1,962,463.

In recent years rapid increase in the prices of fossil, especially liquid, fuels have generated interest in new ways of extending the usefulness of such fuels. One way is a portable unit for recovering the useful crude oil from the bottom settlings and water in the bottom of crude oil storage tanks.

SUMMARY OF THE INVENTION

In many service stations, as in many homes and factories, fuel oil is utilized as the source of energy for direct space heating or for supplying hot water for domestic supply and/or space heating.

In the present invention, there is provided a unique mobile system and a method for use in a location where fuel oil is being used and where there is a local supply of a waste oil product for recycling the latter and combining it with the fuel oil so as to produce a mixture which is suitable for use as a fuel in the same way that the fuel oil is being used.

In a preferred embodiment of this invention there is provided a mobile system for preparing a waste lubricating oil product for use as a fuel comprising a source of suction to remove the product from its receptacle in which the product is accumulated, a filter to remove foreign particulate, a meter for measuring and recording its volumetric flow rate, a source of suction to withdraw fuel oil from its storage tank, a mixer to combine the waste oil product and the fuel oil in a preselected volumetric ratio, a filter and separator unit to remove unwanted water and other contaminants, and apparatus for transferring the mixture to the fuel oil storage tank for use as a fuel. A manifold extending into the fuel oil storage tank provides for the simultaneous withdrawal of fuel oil and return of the mixture. A single pump provides the suction for the removal of liquid from both the waste oil receptacle and the fuel oil storage tank.

In another preferred embodiment of this invention there is provided a process for carrying out the various functions described above.

It is thus a principal object of this invention to provide a compact mobile system and method for extending the supply of fuel oil in situ by adding to it in preselected volumetric proportion a waste oil product.

It is another object of this invention to provide a compact mobile system and method for extending the supply of fuel oil by adding a waste oil product and employing a unique manifold structure for simultaneously withdrawing the fuel oil from and returning the mixture to the fuel oil storage tank.

Other objects and advantages of this invention will hereinafter become obvious from the following description of preferred embodiments of this invention.

BRIEF DESCRIPTION OF THE DRAWING

The FIGURE shows a partially schematized view of a preferred embodiment of this invention.

DETAILED DESCRIPTION OF THE INVENTION

Referring to the FIGURE, there is illustrated the mobile fuel extending system 10, embodying the principles of this invention, mounted on the bed 12 of a vehicle 14. System 10 is shown during the process of being used to withdraw waste crank case oil 16 within a receptacle or tank 18, withdrawing fuel oil 22 from a storage tank 24, and returning the mixture to the latter.

System 10 consists of a power unit 26 driving a suction pump 28 through a belt drive 32, and other components to be described. Power unit 26 may be a self-contained auxiliary engine with its own fuel supply or any other convenient source of power such as a takeoff from the drive shaft of vehicle 14 as is understood in the art. Outlet tube 34 of pump 28 is connected to a reel 36 on which is wrapped two hoses, return hose 38 and a suction hose 42.

Tube 34 is connected through reel 36 to return hose 38. Suction hose 42 is connected through reel 36 to a tube 44 which is connected to the inlet side of filter/separator unit 46. The latter is designed to remove fine particulate and separate out any water present. A drain 47 is provided for a purpose to be later described. In tube 44, as illustrated, is a control valve 48 and a check valve 52 whose functions will be described below. Outlet pipe 54, having a valve 55, from unit 46 is the inlet to pump 28.

Hoses 38 and 42 terminate in a manifold 56 shown immersed in fuel oil storage tank 24. Manifold 56 consists of a full length pipe 58 and a pipe 62 of shorter length, and a spacer 64 at the bottom of the former to insure that the bottom opening or inlet 66 to pipe 58 is not at the very bottom of tank 24. Outlet 68 on pipe 62 is located above the level of oil within tank 24. This can be insured by either making pipe 62 very short or by making pipes 58 and 62 slidable with respect to each other. The use of a measuring stick (not shown) in tank 24, as is understood in the art,may be utilized to establish the level of oil 22. Quick disconnects (not shown) may be utilized to connect hoses 38 and 42 to manifold 56.

Referring to waste crank case oil storage tank 18, a flexible suction pipe or hose 72 is shown immersed with its bottom opening protected by a screen 74. The other end of hose 72 leads to a duplex screen 76. A check valve 78 in hose 72 prevents back flow. Unit 76 typically would contain a separation tank and a filter bag to remove the larger particulate.

Outlet tube 82 leads to point A in pipe 44 where the two flows, to be explained later, are combined. A volumetric flow meter 84 in tube 82 measures on a continuous basis the rate of waste oil flow and a printed readout may be provided to indicate total flow. A control valve 86 in tube 82 is used to control the rate of flow. By manipulating valves 48 and 86 the volumetric ratio of the two liquids mixing at point A may be adjusted. In this invention, the exact ratio is not critical, and in fact, the approximate ratio is established in advance by the fact that the diameter of tube 82 is substantially less than the diameter of tube 44 with the result that this ratio with valves 48 and 86 open is approximately 10 to 1. Further, the final ratio of the two oils is determined by how much waste oil in tank 18 is mixed with the fuel oil 22 in tank 24. Valves 48 and 86 can be employed to stop either flow or to increase the ratio even further by throttle valve 86, or to reduce the overall flow rate within the system.

System 10 as described above operates in the following manner:

Vehicle 14 pulls into an automotive service station or other establishment which has a storage tank 24 for its fuel oil 22 and a tank 18 in which has been collected waste oil. Flexible suction hose 72 is inserted into tank 18 and manifold 56 is inserted into tank 24, insuring ordinarily that opening 68 in short pipe 62 is above the level of oil 22 within the tank.

Valves 48, 55, and 86 are opened and power unit 26 is started up so as to drive pump 28. Pumping action by the latter provides all of the power and suction required for the operation for system 10, including suction for flexible hose 72 in tank 18 and tube 58 in tank 24. Waste oil 16 from tank 18 enters hose 72 and passes through duplex screen unit 76 where particulate down to some preselected value is removed. This oil is then metered and mixed with fuel oil 22 at junction A.

Fuel oil 22 in tank 24 enters tube 58 of manifold 56 and suction hose 42 on reel 36, passing through tube 44 and mixes with the filtered waste oil at junction A. This mixture, still under the suction provided by pump 28, passes into filter/separator unit 46 where water and other undersirable components are removed. Both duplex screen unit 76 and filter/separator 46 are available commercially.

The mixture then passes through tube 54 and pump 28 into outlet tube 34 and return hose 38 back into tank 24. System 10 functions as described until either all of the waste crank case oil in tank 18 is transferred to tank 24, or until some preselected volume of waste oil as measured by meter 84 is transferred. Water in unit 46 is removed by drain 47.

It has been found that the mixture of waste oil and fuel oil in tank 24 functions satisfactorily as a fuel and that waste oil, heretofore considered to be worthless, with this process is worth as much as fuel oil since the heat content of the waste oil is about the same as that of fuel oil. Preferably a final mixture of 75% fuel oil and 25% waste oil has been found to be satisfactory, although with higher temperatures it is possible to increase the proportion of waste oil.

A mobile system as hereinabove described has been built and operated successfully. For filter/separator unit 46, a unit manufactured by Racor, which is described as a water separator and fuel filter, has been found to be satisfactory. After the waste oil product and fuel oil have been mixed in accordance with this invention, no noticeable separation occurred during a reasonable period of observation. It should be noted that with valve 86 closed, the system can be run for a time to insure that the mixing is thorough.

While only preferred embodiments of this invention have been described, it is understood that many modifications thereof are possible without departing from the principles of this invention.

What is claimed is:

1. A compact mobile system for reprocessing on a continuous basis a waste oil product for use as a fuel comprising means for withdrawing said waste oil product until exhausted or otherwise terminated from a first reservoir means in which said product is collected, means for filtering on stream said product to remove foreign particulate matter, means for simultaneously withdrawing fuel oil from a second reservoir means in which said oil is stored for use, means for mixing on stream the filtered product and said oil, means for filtering on stream the mixture to remove water and additional foreign particulate matter, means for simultaneously supplying said mixture to said second reservoir means while fuel oil is being withdrawn from said second reservoir, and manifold means which includes said means for withdrawing fuel oil from, and said means for supplying said mixture to, said second reservoir means as a unitary structure.

2. The mobile system of claim 1 in which said unitary structure consists of first and second pipes, said first pipe extending the full length of said manifold means and having an inlet opening at the bottom thereof for said fuel oil, said second pipe terminating at its bottom with an opening at a point above the bottom of said first pipe inlet opening for the discharge of mixture into said second reservoir means.

3. The mobile system of claim 2 in which said second pipe is slidably adjustable with respect to said first pipe for adjusting the height at which said second pipe discharges said mixture.

4. The mobile system of claim 3 in which said system is mounted on a powered vehicle.

5. The mobile system of claim 4 having means for measuring the volumetric flow of said product being withdrawn from said first reservoir means.

6. A method for the in situ reprocessing of waste oil product for use as a fuel comprising continuously and simultaneously carrying out the steps of withdrawing said waste oil product from a first reservoir means in which said product has been collected, filtering said product to remove foreign particulate matter, withdrawing fuel oil from a second reservoir means in which said oil is stored for use, mixing the filtered product and said oil, adjusting the volumetric ratio of said product to said oil to obtain a preselected mixture, filtering the mixture to remove water and other foreign particulate matter, and supplying said mixture to said second reservoir means.

7. The method of claim 6 in which the fuel oil is withdrawn and the mixture is discharged into said second reservoir means through a unitary structure to render efficient and quick the application of said method.

8. The method of claim 7 in which all of the apparatus required for carrying out the steps of the method is carried on a vehicle for facilitating the in situ reprocessing.

9. The method of claim 8 in which the volumetric flow of said waste oil product is measured.

* * * * *